United States Patent
Durham et al.

(10) Patent No.: US 7,276,831 B1
(45) Date of Patent: Oct. 2, 2007

(54) SPLIT-POLE FIELD-MATCH MOTOR

(75) Inventors: Gary L. Durham, Stuart, FL (US); Harold Stephen Durham, Wichita, KS (US)

(73) Assignee: Tri-Seven Research, Inc., Stuart, FL (US)

( * ) Notice: Subject to any disclaimer, the term of this patent is extended or adjusted under 35 U.S.C. 154(b) by 179 days.

(21) Appl. No.: 10/315,845

(22) Filed: Dec. 10, 2002

(51) Int. Cl. *H02K 1/00* (2006.01)

(52) U.S. Cl. .................. 310/184; 310/179; 310/254

(58) Field of Classification Search ........ 310/179–184, 310/254, 208–210, 186
See application file for complete search history.

(56) References Cited

U.S. PATENT DOCUMENTS

| | | | | | |
|---|---|---|---|---|---|
| 2,544,571 | A | * | 3/1951 | Trickey | 318/820 |
| 2,610,312 | A | * | 9/1952 | Seay | 318/747 |
| 2,802,123 | A | * | 8/1957 | Tweedy et al. | 310/198 |
| 3,353,046 | A | * | 11/1967 | Papst | 310/214 |
| 3,422,292 | A | * | 1/1969 | Port et al. | 310/15 |
| 3,535,572 | A | * | 10/1970 | De Rugeris | 310/168 |
| 3,629,626 | A | * | 12/1971 | Abbott | 310/49 R |
| 4,029,977 | A | * | 6/1977 | Chai et al. | 310/49 R |
| 4,038,575 | A | * | 7/1977 | Nordebo | 310/179 |
| 4,075,521 | A | * | 2/1978 | Nordebo | 310/184 |
| 4,401,939 | A | * | 8/1983 | Korbell | 322/59 |
| 4,551,708 | A | * | 11/1985 | Welburn | 341/116 |
| 4,733,113 | A | * | 3/1988 | Smith | 310/49 R |
| 4,792,709 | A | * | 12/1988 | Smith et al. | 310/49 R |
| 5,923,142 | A | * | 7/1999 | Li | 310/180 |
| 6,075,302 | A | * | 6/2000 | McCleer | 310/166 |
| 6,787,958 | B1 | * | 9/2004 | Walter | 310/168 |

FOREIGN PATENT DOCUMENTS

| | | | |
|---|---|---|---|
| JP | 01081648 A | * | 3/1989 |
| WO | WO103272 A1 | * | 1/2001 |

* cited by examiner

*Primary Examiner*—Thanh Lam
(74) *Attorney, Agent, or Firm*—Young Basile

(57) ABSTRACT

An electric motor having a plurality of rotor and stator poles, the poles of one element being alternately polarized and neutralized due to the use of direct current and alternating current windings on each pole. The poles of like current are connected in series, and the direct current poles are energized in synchronization with the alternating current poles.

8 Claims, 7 Drawing Sheets

Circuits For Split-Pole Field-Match Motor

----- Alternative Parallel Circuit For DC Coils

SPLIT-POLE FIELD-MATCH MOTOR

FIELD OF THE INVENTION

The invention pertains to electric motors having a plurality of magnetic poles wherein the poles are alternately polarized and neutralized to produce rotation of a motor rotor.

STATE OF RELATED ART

It is commonly known that a magnet pole or a ferrite pole with an energized direct current (DC) coil around it will only allow flux which is in-phase (with the same magnetic orientation) to travel through the pole. Flux which has an opposite magnetic orientation will be rejected unless it is strong enough to overpower and reverse the permanent magnet pole's orientation or to "capture" and reorient the ferrite pole and align it against the DC coil. According to traditional magnetic theory, each magnet or DC electromagnet will only pass flux in one direction, from the south pole through to the north pole. A magnet or DC electromagnet will not allow flux to pass from the north pole through to the south pole.

Further, it is also known that if two coils of equal turns with equal amperage flowing in their turns (equal ampere-turns) are on the same ferrite pole, but with opposite magnetic orientation, that the net magnetic flux coming from that ferrite pole will be zero (0) as the two coils will cancel each other. Because the net magnetizing force is zero (0), the domains of the ferrite pole are not aligned in any one direction and thus remain random under these conditions. The equal and opposite electromotive forces of the two coils cancel each other's magnetomotive force in the ferrite pole, equaling zero (0) magneto-mechanical force between the end of the pole and the ferrite rotor as no flux is manifested from the pole end.

Further, it is known that if two coils of equal turns with equal amperage flowing in their turns are on the same ferrite pole, and they have the same magnetic orientation, the flux from both coils will series in the pole and will cause a magnetomotive force on the ferrite pole much greater than that of each coil independently and that the net flux concentration and manifestation, all other things being equal, will be much greater at the pole end than if only one coil is activated.

OBJECTS OF THE INVENTION

It is an object of the invention to provide an electric motor having poles energized by coils wherein each pole is energized by two separate coils and the coils are so energized as to cause a given pole to have a momentary maximum polarity effect and a momentary neutralized effect to create an effective motor rotor rotation.

Another object of the invention is to provide an electric motor having a plurality of poles wherein magnetic polarity in the poles is produced by coils or windings and where each coil is under the influence of separate coils so synchronized as to alternately produce a predetermined polarity in the pole and a neutral polarity wherein motor rotation is produced A further object of the invention is to produce a split-pole electric motor which requires only a single phase system and yet provides results similar to multi-phase systems resulting in a less expensive controller than previously known.

An additional object of the invention is to provide an electric motor having a plurality of adjacent poles, each pole being wound by two separate coils, one of the coils utilizing direct current while the other coil utilizes alternating current, and the direct current is controlled by the cycling of the alternating current coils to alternately produce an amplified polarity and a neutral or zero (0) polarity in a given pole.

SUMMARY OF THE INVENTION

In this disclosure, the effect of the invention will be called the Field-Match effect. The reason for the use of the word "match" is that it has two near opposite meanings: one which means "to agree, to be alike" (which we will designate "match[1]") and another meaning which means "to oppose", as in a "football match" (which we will designate "match[2]"). The torque produced by the stator on the rotor of the Split-Pole Field-Match Motor is caused by a unique design in which two coil fields of near equal value are matched on a single stator pole, alternately, in both senses of the word "match".

First, they are "matched[1]" in one part of the electrical phase as like-fields on the same pole which series and causes the pole to exert a magnetomechanical force on a laminated, ferrite, salient poled rotor, then the coils are "matched[2]" as opposing fields on the same pole in the opposite part of the electrical phase and the opposing magnetomotive forces exerted on the pole cause there to be no magnetomechanical force exerted on the ferrite rotor, as no flux is manifested from the pole.

The Split-Pole Field-Match Motor uses this concept to integrate all the active magnetic components of a motor into the stator which interacts with a laminated salient pole rotor in a smooth and efficient way which makes it unnecessary to use an induction rotor. This makes the stator-rotor configuration look much like that of a variable reluctance motor However, the split-pole field-match system used in the stator of this motor to cause torque on the rotor creates the torque in a very different manner from that of any variable reluctance motor now in use, and this distinction will be easily appreciated from the following description. The Split-Pole Field-Match motor integrates direct current (DC) coils and alternating current (AC) coils on the stator in an overlap configuration to create field concentrations on alternate sets of half-poles on the stator.

With the method of the invention, the split-pole field-match system can produce motors whose operation requires only a single-phase system and produces competitive results equal to motors which require the controller to provide multi-phase operation, thus making the use of less expensive controllers for the same result possible.

It is anticipated that one of the major embodiments of this motor system will provide a new alternative for applications which now use brushless DC motors with the advantage being cost and a wider RPM range due to the inherent safety and durability of the salient pole ferrite rotor which requires no induction coils or casings or no magnets which require lower top RPM to remain within a safe range.

In the disclosed embodiment of the invention, an even number of poles are defined upon the electric motor stator, and two adjacent poles are defined as a set A second set of a pair of poles constitute one of the poles of the first set and the adjacent pole not of the first set. Accordingly, first and second sets of poles will be adjacent and include a common pole. The first set of poles is wound with a direct current coil, and a second set of poles is wound with an alternating current coil. This arrangement causes the first pole set to have a complete DC coil wound thereabout and two one-half alternating current coils disposed thereon. The second set of poles will include a full AC coil and two one-half DC coils. The DC coils are energized through a rectifier to rectify the AC quasi-sine wave from an inverter circuit, or the AC from traditional wall current, connected to the AC coils. The AC coils are all connected into series with each other, and likewise, the DC coils are all connected into series with each other. Thereby, the AC current within the AC coils will be perfectly in synchronization with the rectified DC pulses in the DC coils, and the result is that one of the poles of the first pole set alternately is polarized with a predetermined polarity which is intensified by the effects of the two coils influencing the pole, and the other pole of the set will be neutralized due to the opposite polarity effect of the coils while the first pole is being polarized. In the second set of poles, the non-common pole will be alternately polarized oppositely with effect to the polarized first pole set and alternately neutralized This inter-connection and energization of poles results in alternate poles being oppositely polarized while having a neutralized pole in between This polarity arrangement will cause rotation of the rotor due to the attraction of the rotor poles to opposite polarity stator poles.

BRIEF DESCRIPTION OF THE DRAWINGS

The aforementioned objects and advantages of the invention will be appreciated from the following description and accompanying drawings wherein:

FIGS. 7 and 8 illustrate how the fields of the DC coils interact with the fields of the AC coils, wherein FIG. 7 illustrates the positive electrical half phase, and FIG. 8 illustrates the negative electrical half phase;

DESCRIPTION OF THE INVENTION

Figure 1:
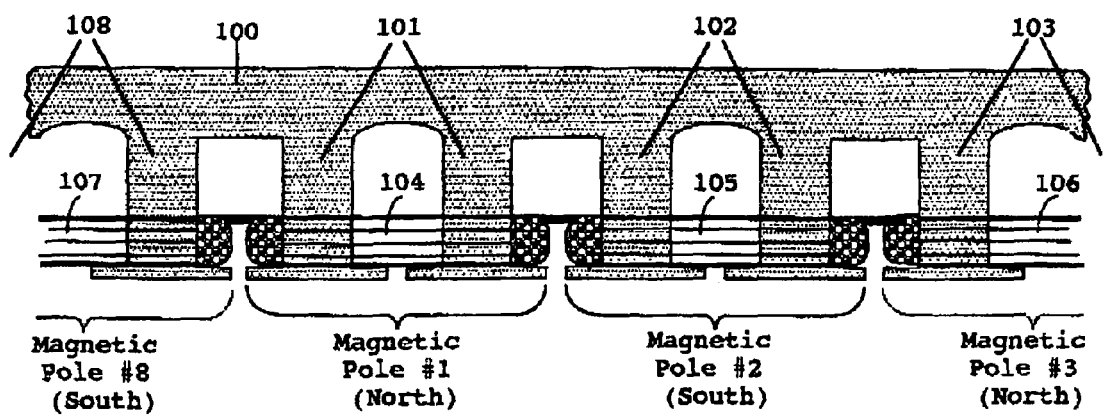
FIG. 1 is a partial schematic view of a motor stator in accord with the invention illustrating the direct current coils, only, being wound upon adjacent sets.

FIG. 1 is a diagrammatic view of a portion of the Split-Pole Field-Match Motor stator 100, which, in its entirety, would be an eight (8) pole stator, in which only the DC stator coils 104, 105, 106, 107 are shown wrapped around the split-poles 101 and 102 (fully shown) and 103 and 108 (partially shown). As illustrated, split-pole 101 is designated as magnetic-pole #1 and will always have a north field being induced into both halves of the pole by the DC coil 104. This means that the two salient protrusions which make up the two halves of split-pole 101 form a single magnetic pole which will always have a north field on the face of one of its halves. Split-pole 102 is designated as magnetic-pole #2 and always has a south field being induced into both halves of the pole by the DC coil 105. This means that the two salient protrusions which make up the two halves of split-pole 102 form a single magnetic pole which will always have a south field on the face of one of its halves. The description for split-pole 103, which is designated magnetic-pole #3, is otherwise the same as that for split-pole 101 except that its DC field is obviously induced by DC coil 106. This pattern of north, south, north, south magnetic split-poles continues all around the inside circumference of the stator until it completes the stator split-poles at split-pole 108, which is next to split-pole 101 and is designated as magnetic pole #8, which always has a south field on one of its halves. It can also be observed from FIG. 1 that the halves of each split-pole are spaced apart so that the space used to split the various poles is equal to the space between each of the magnetic poles 1, 2, 3, etc. Thus, all half-poles are the same distance from its other half as it is from the nearest half of any split-pole adjacent to it around the inner circumference of the stator.

Figure 2:
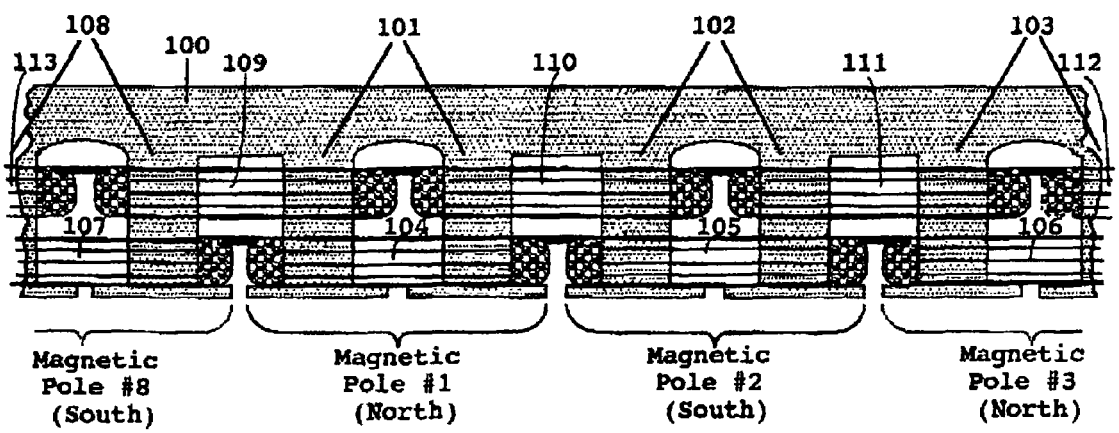
FIG. 2 is a partial schematic view similar to FIG. 1 illustrating the alternating current coils wound upon the appropriate poles of the stator.

In FIG. 2, the AC coils of the stator are shown added to the same portion of the stator as in FIG. 1. As is illustrated, the AC stator coils 109, 110, 111, 112, and 113 are shown wrapped through the split of two different poles so that the AC coils are wrapped on a right half-pole and a left half-pole of two adjacent split-poles which, together, will make up that AC coil's ferrite core. Thus, AC stator coil 109 is wrapped around the right half-pole of split-pole 108 and the left half-pole split-pole 101, and AC stator coil 110 is wrapped around the right half-pole of split-pole 101 and the left half-pole of split-pole 102, etc. This means that each AC coil is wrapped so that its ferrite core is made up of two half-poles from two different split-poles which have two different DC fields being induced into them and thus, one of the half-poles of its core has a south field induced into it from its DC coil, and the other adjacent half-pole has a north field induced into it from its DC coil.

Thus, it can be understood that as the AC coils alternate between the positive and negative portions of the electrical phase, it will always match one of the half-poles magnetically as defined by "matched[1]" earlier in this disclosure and match the other half-pole magnetically as defined by "matched[2]" earlier in this disclosure. Thus, in each half of the electrical phase, it will always magnetically series with the DC coil on one of the split-poles causing magnetic flux to be induced into that half-pole which will cause a magnetomechanical force to be set up between that half-pole and a ferrite pole of the rotor and it will, at the same time, magnetically oppose the DC coil on the other adjacent half-pole which makes up its core, thus inducing an equal and opposing magnetomotive force in that half-pole and causing it to manifest no flux and thus not cause a magnetomechanical force to be set up between that half-pole and a ferrite pole of the rotor. In the next electrical half-phase, the AC coils will reverse their field, and the opposite effect will occur where they will now series with the half-pole and DC coil it formerly opposed and will also oppose the other half-pole and DC coil with which it formerly went into series.

The AC coils are alternately wrapped so that each AC coil produces the opposite magnetic field from the AC coil either to the right or left of it. This will ensure that a magnetic pattern of flux will be created in which, for one electrical half-phase, every other half-pole, one in each split-pole (e.g., the ones on the left) will manifest magnetomechanical force on the rotor while the other set, i.e., the ones on the right, will not. In the next opposite electrical half-phase, the half-poles on the right will manifest magnetomechanical force on the rotor while the former set of half-poles, the ones on the left, will not. This is illustrated in FIGS. 3 and 4.

Figure 3:
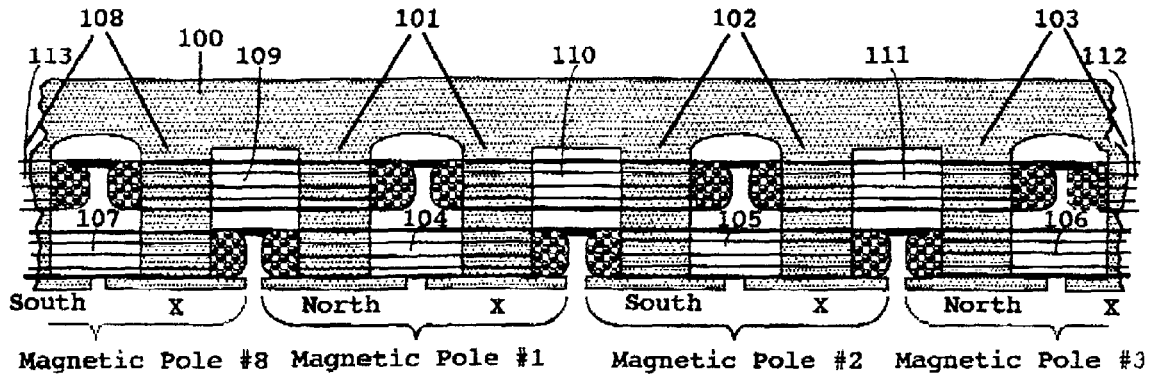
FIG. 3 is similar to FIG. 2 and illustrates the polarity and neutrality of adjacent poles and sets.
Figure 4:
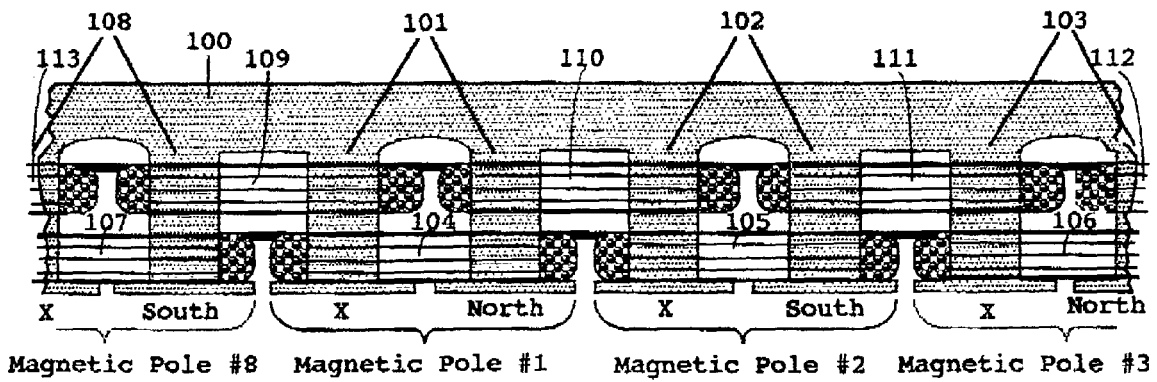
FIG. 4 is similar to FIG. 3 illustrating the polarity and neutrality of adjacent poles during the opposite cycle with respect to FIG. 3.
Figure 5:
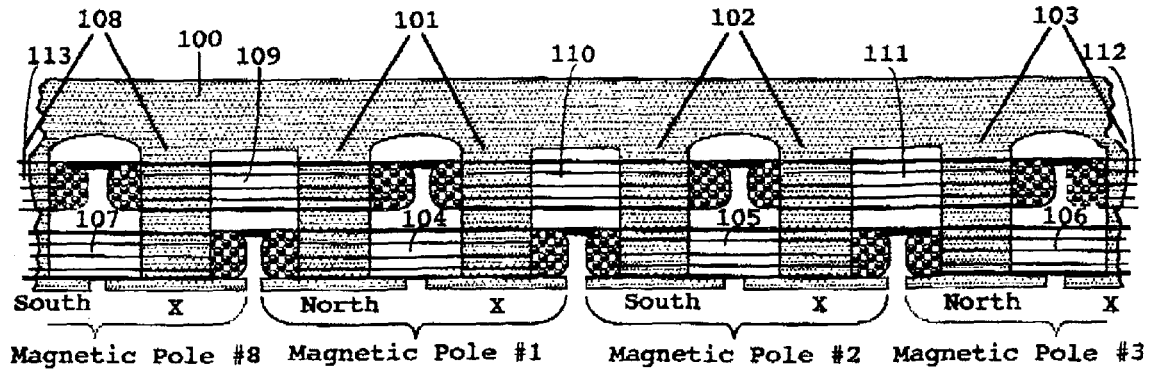
FIG. 5 is similar to FIG. 3 illustrating the polarity and neutrality of adjacent poles after the cycle illustrated in FIG. 4.

In FIG. 3, an "X" is placed below each right-hand half-pole of split-poles 101, 102, 103 and 108. This is to indicate that there is no field being produced in these half-poles because the AC coils on those half-poles are out of phase with the DC coils on those half-poles during the electrical half-phase. Thus, no field is manifested. At the same time, the left-hand half of each split-pole 101, 102, 103, and 108 shows either a north or a south below it indicating that a field is being induced by the AC coils into those half-poles which is in phase with the DC coils of those split-poles; thus, field is manifested. In FIG. 4, the next opposite electrical half-phase is shown, and the left-hand half-poles of each split-pole now has an "X" to indicate that the AC coils have reversed their field and are now out-of-phase with the DC coils on those left-hand half-poles. At the same time, the right-hand half of each split-pole 101, 102, 103, and 108 shows either a north or a south below it indicating that a field is being induced by the AC coils into those half-poles which is in-phase with the DC coils of those split-poles. Thus, field is manifested. FIG. 5 illustrates a return of the AC coils to the first electrical half-phase as in FIG. 3, and the result is that the magnetic pattern returns to the same as in FIG. 3, thus causing an alternating, repeating pattern of field manifestation from the half-poles of each split-pole.

Figure 6:
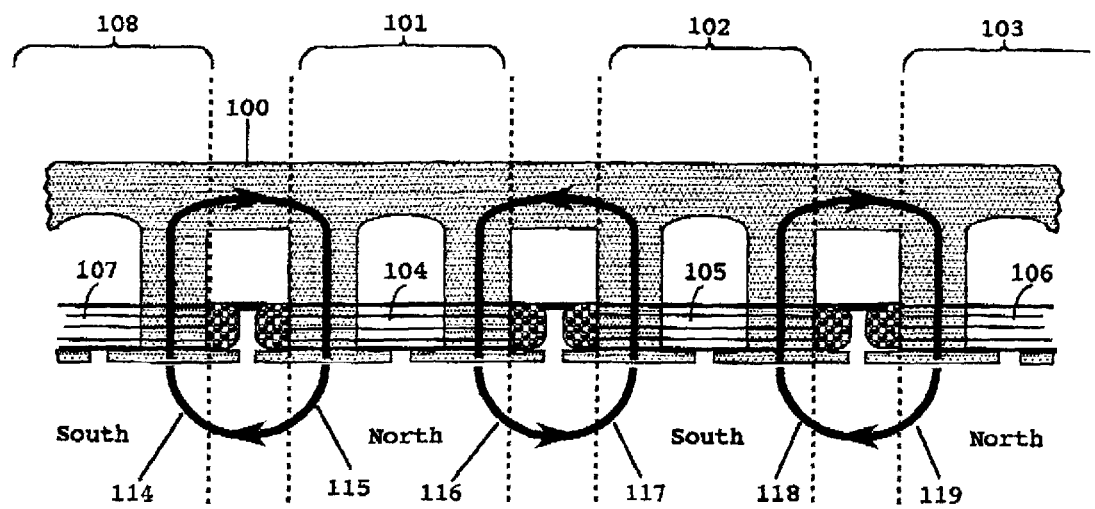
FIG. 6 is a schematic depiction of the field flow in adjacent poles only due to the direct current coils.
Figure 7:
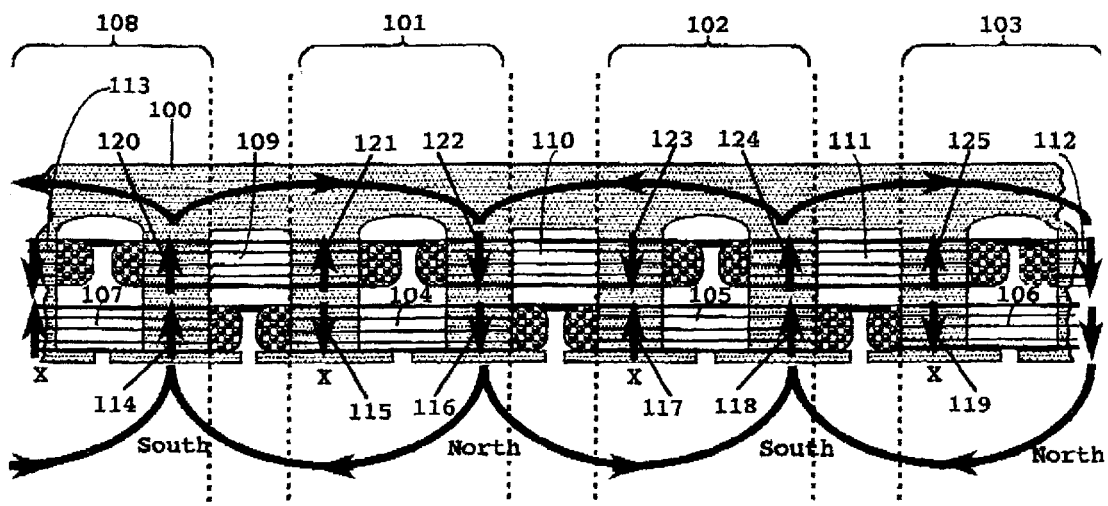
Figure 8:
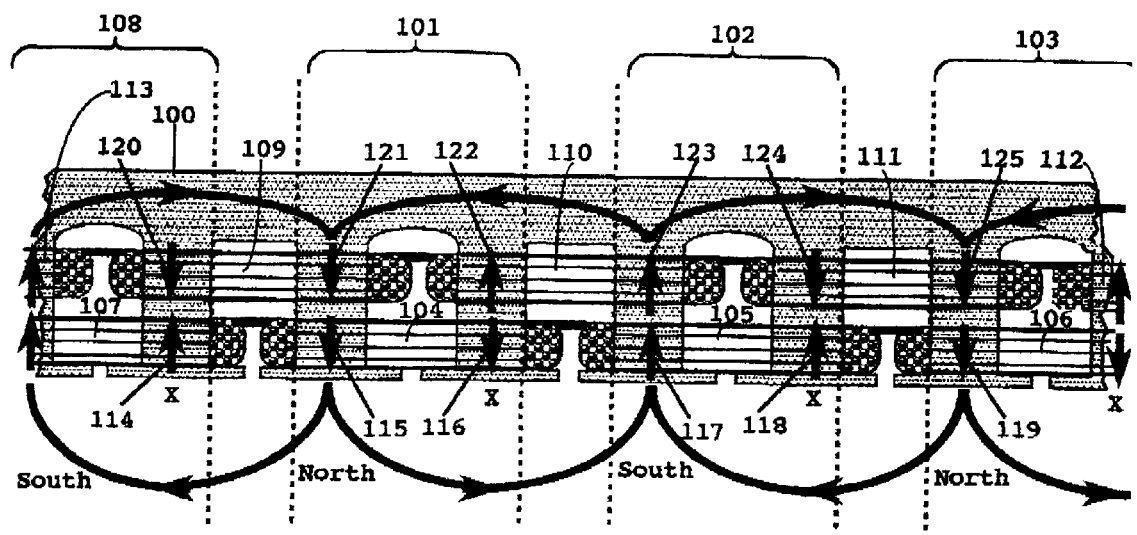

FIG. 6, is a diagrammatic depiction of the field flow in the stator due only to the DC coils. As can be seen, this creates north and south domains in the stator which will always be north or south unless opposed by the field of an AC coil. FIGS. 7 and 8 show how the fields of the DC coils interact with the AC coils, with FIG. 7 being the positive electrical half-phase and FIG. 8 being the negative electrical half-phase.

Figure 9:
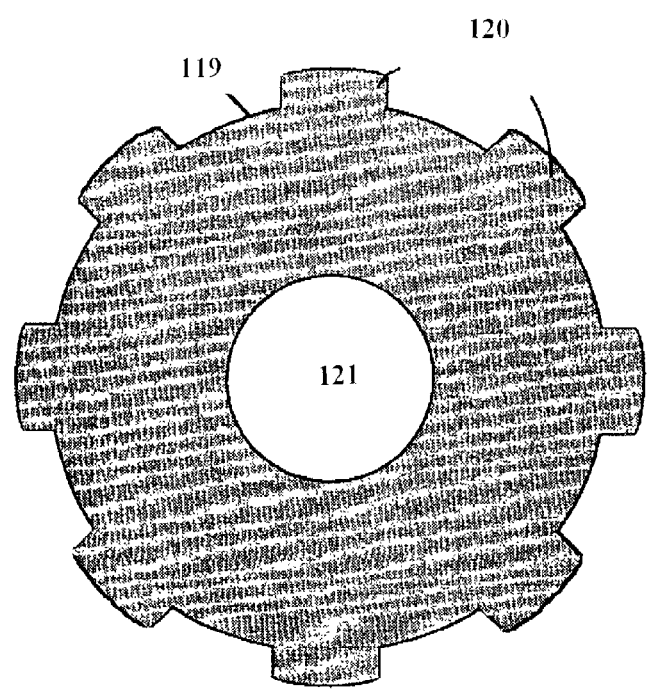
FIG. 9 illustrates a rotor of the type as would be utilized with the stator shown in FIGS. 1-8.

The laminated, salient pole rotor that is used with the Split-Pole Field-Match stator has salient poles which match the number of magnetic poles on the stator (in the case of the embodiment illustrated above, eight poles), and each salient pole is sized and spaced so that it matches the face of a half-pole of each split-pole. Thus, there is a rotor pole to interact with every other half-pole alternately as the rotor rotates. Such a rotor is illustrated in FIG. 9, where laminated ferrite rotor 119 is shown with salient poles 120, which are eight (8) in number. Power take-off shaft center hole 121 is provided so the rotor 119 can be press fitted to a power take-off shaft.

The current to the motor can be supplied in different ways. In the preferred embodiment illustrated above, it is supplied by a single-phase inverter circuit which produces rectangular current waveforms with continuously variable frequency controlled by the speed of the motor by means of simple position sensors.

In the embodiment above, the AC coils are all connected into series with each other. The DC coils are all connected into series with each other. The DC coils are all connected into series with each other and use a bridge circuit to rectify the quasi-sine wave from the inverter circuit into DC pulses which power the DC coils. These DC pulses are perfectly in synchronization with the AC pulses to the AC coils because they are from the same source and are simply bridge-rectified. A constant DC from an alternate power source can be used or a capacitor placed into the bridge circuit to make the pulse DC constant This gives a different kind of motor response which can be "tuned" by adjusting the DC current for the desired performance. However, the pulse DC matches the AC stator coils almost automatically if the AC and DC coils have been properly matched which is usually that they have the same number of turns per coil and wound from the same size magnetic winding wire.

Figure 10:
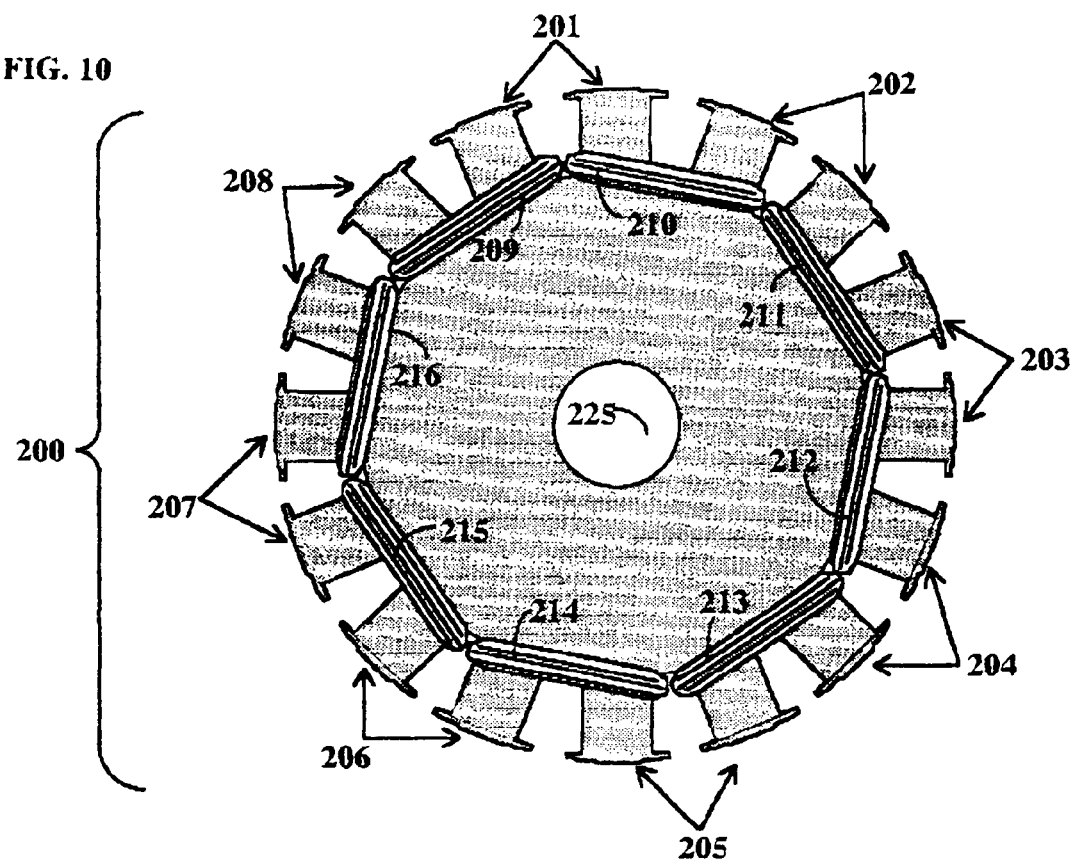
FIG. 10 is a schematic illustration utilizing the principles of the invention wherein rotor poles are wound in a manner equivalent to the stator poles.
Figure 11:
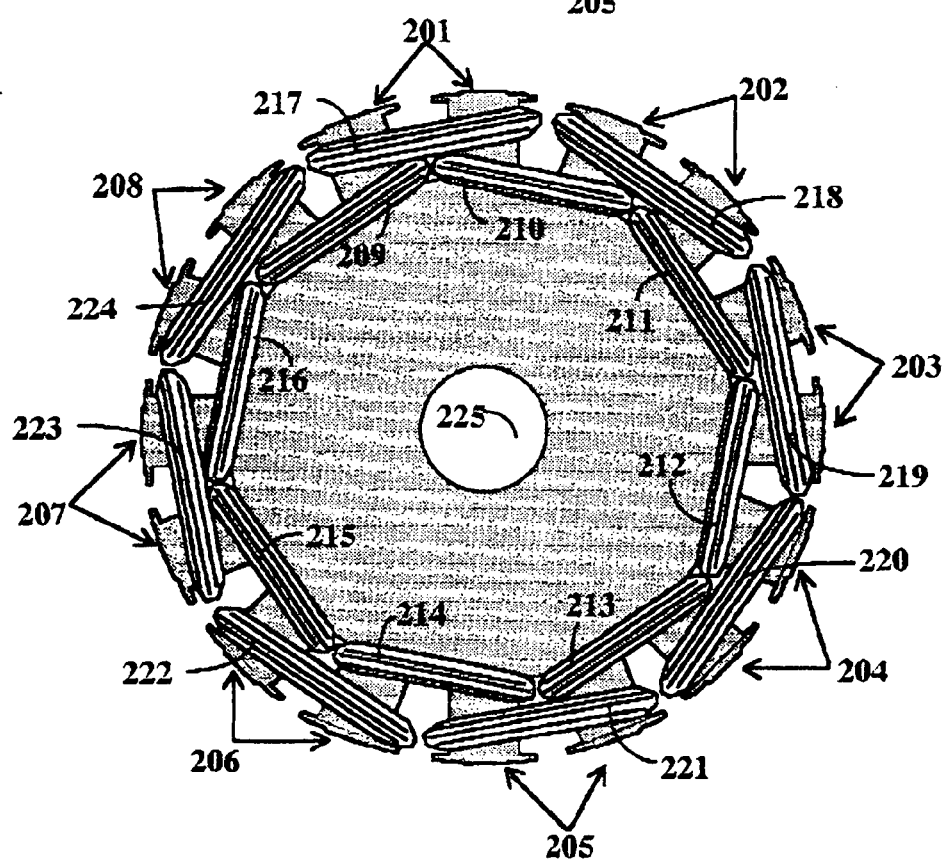
FIG. 11 is a schematic illustration showing the AC and DC coils located upon rotor poles in a manner equivalent to FIGS. 2-5 and 7.
Figure 12:
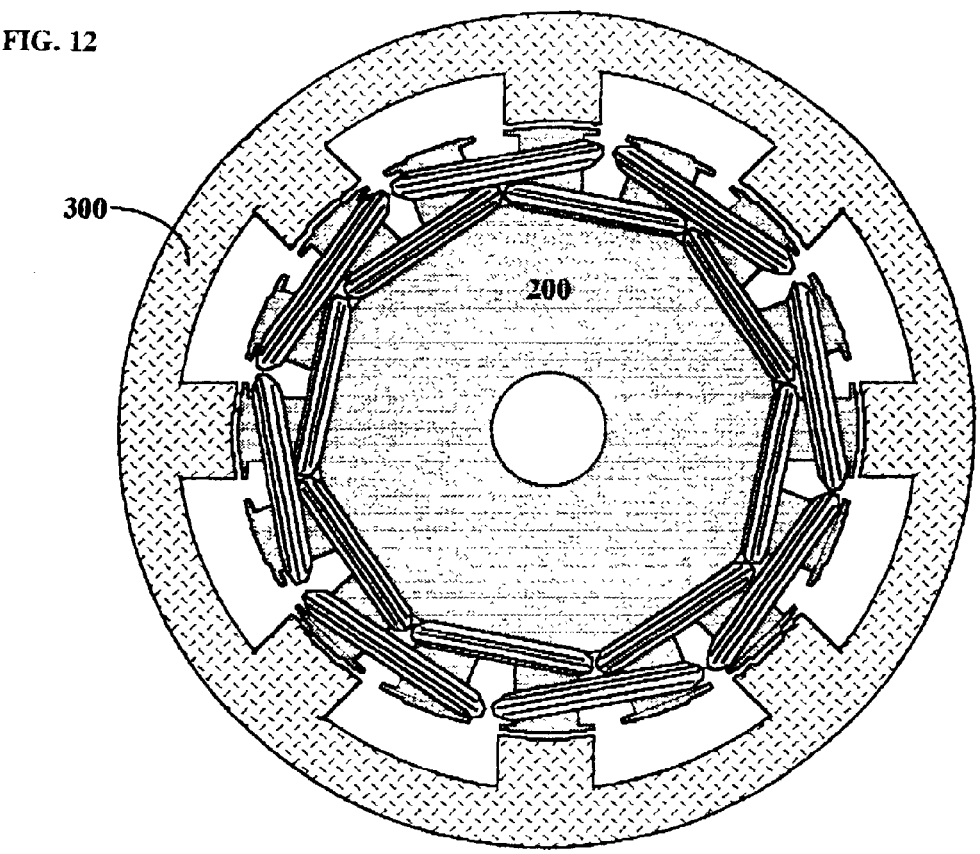
FIG. 12 is a schematic illustration of a transverse cross-section between an assembled motor rotor and stator wherein the rotor poles are wound as shown in FIG. 11.

In FIGS. 10-12, the concepts of the invention are shown wherein the rotor poles, rather than the stator poles, are coil wound in the manner previously described. The inventive concepts and principles of motor operation are identical in the embodiments of FIGS. 10-12 as in the previously described embodiments. FIG. 10 illustrates the rotor at 200, and the rotor includes pairs of adjacent poles 201-208. In FIG. 10, these poles are wound in pairs of sets of coils 209-216. The coils 209-216 constitute bifilar wound DC coils, and the identical coils are oppositely connected to a DC circuit which alternately switches them so that they alternately induce oppositely oriented flux in their poles. The original single set (non-bifilar wound) DC coils are either put in parallel with these bipolar coils or series. The circuit which is used to control these configurations is shown in FIG. 13.

In FIG. 11, the coils 209-216 constitute AC coils, while the coils 217-224 are DC coils. The embodiment shown in FIG. 11 operates in the manner described in FIGS. 1-9. The rotor 200 includes the central hole 225 for receiving the shaft, and as shown in FIG. 12, the stator 300 includes eight poles for accommodating the sixteen-hole rotor having eight sets of poles. The embodiment of FIG. 11 operates in the same manner as the embodiments of FIGS. 1-9.

Figure 13:
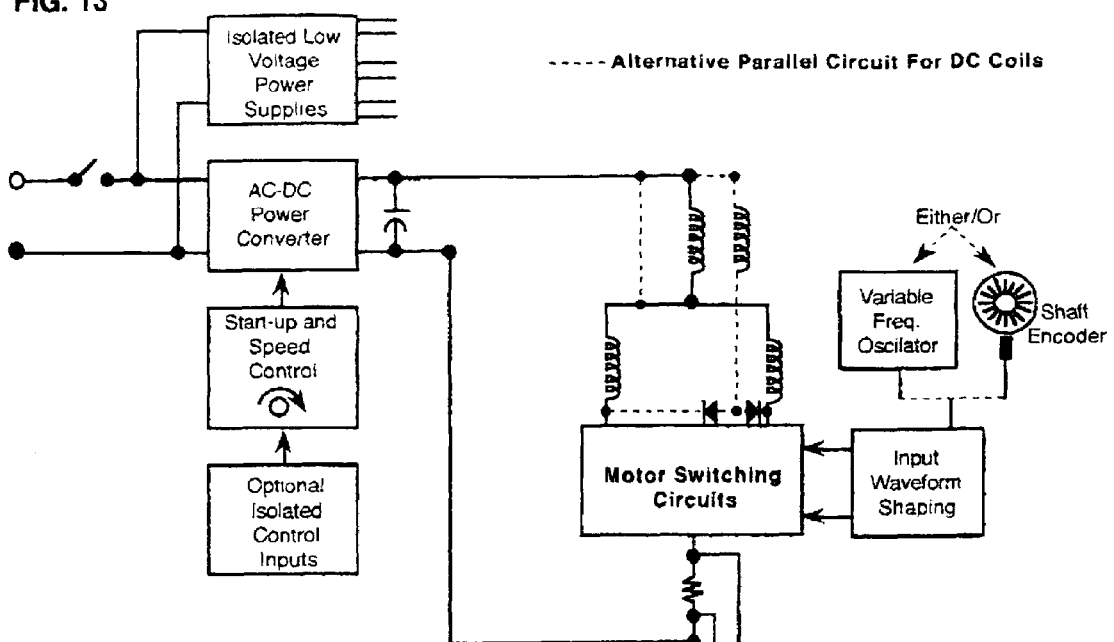
FIG. 13 illustrates the basic circuit used to control the motor of the invention if the AC coils are replaced by bifilar windings. The two resulting coils are connected oppositely to the DC switching and are triggered alternately so that they alternately induce the opposite flux field into the poles around which they are wrapped. This arrangement makes it possible to use a simpler DC circuit which lowers costs.

The circuit shown in FIG. 13 is used to control the pole wound configuration shown in FIG. 10. The various components of the circuit are illustrated by applied legends.

Figure 14:
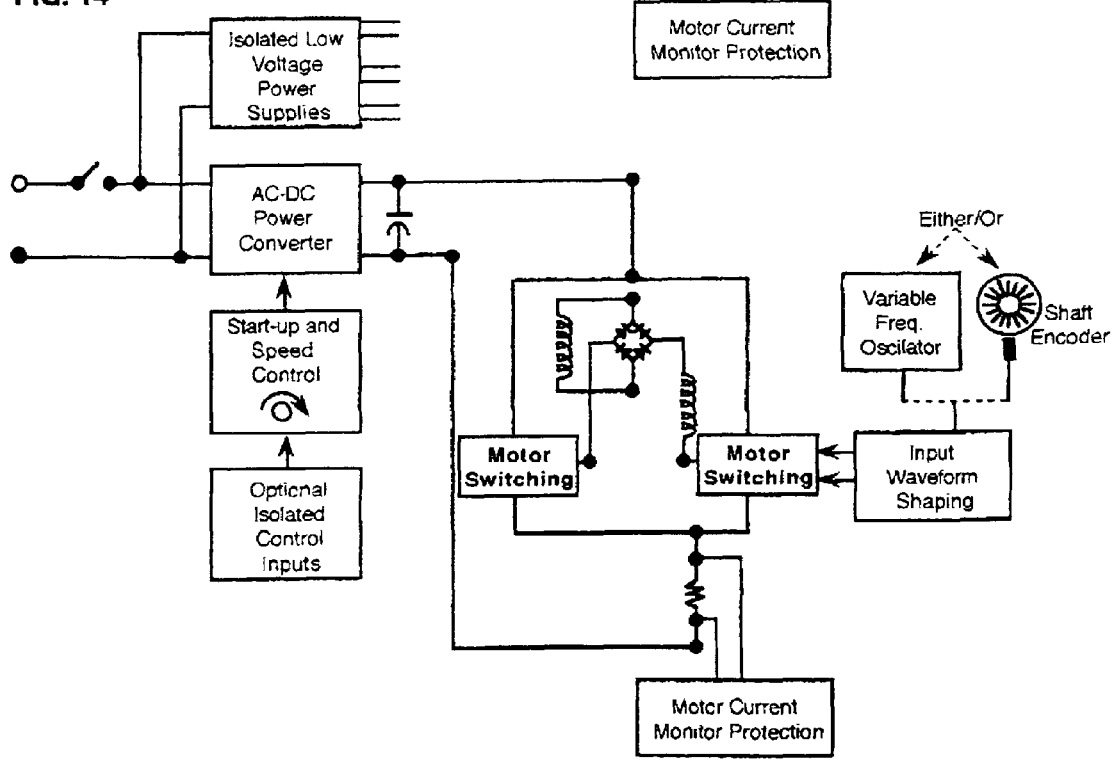
FIG. 14 illustrates the basic circuit design to control the motor of the invention if the AC coils are retained and used. In such instance, the circuit creates alternating voltage and current as desired and applies it to the AC coils and the DC coils. The DC coils, as shown, are connected through a full-wave bridge, and therefore, have DC pulses which are in phase with the AC pulses in the AC coils.

In FIG. 14, the circuit illustrated is that used to control the motor of FIGS. 1-9 and FIG. 11, wherein one set of DC coils and one set of AC coils are used with pairs of poles. The motor of the invention can run without a circuit from normal 120 volt alternating current When the number of pole divisions are high in the stator and the pole widths are small, the motor of the invention will start itself under load without the need of circuit or starting coil. When the number of pole divisions is smaller and thus the pole widths are larger, a circuit or starting coil is used for poles to come into synchronization.

It is appreciated that various modifications to the inventive concepts may be apparent to those skilled in the art without departing from the spirit and scope of the invention.

What is claimed is:

1. A method of energizing poles of an electric motor wherein a stator and rotor have an even number of said poles, comprising the steps of:
   providing a stator having a substantially cylindrical structure having alternating salient protrusions and roots, wherein all of said salient protrusions have a common shape extending radially inward, and all of said roots have a common shape;
   providing a rotor having a substantially cylindrical structure coaxially aligned with said stator wherein salient protrusions of said rotor extend radially outward such that said salient protrusions of said stator and rotor are radially adjacent one another, wherein each of said salient protrusions of said stator at least partially oppose a corresponding salient protrusion of said rotor when at least one of said salient protrusions of said stator at least partially opposes a salient protrusion of said rotor;
   winding a first coil and a second coil about a pair of adjacent salient protrusions of said stator or rotor only to form said poles;
   alternately electrically charging all of said poles of the stator or rotor only with a magnetic force produced from said first and second coils whereby alternate poles are alternately charged with opposite magnetic polarity, the result being the neutralizing and charging of the poles resulting from said first and second coils being wound about adjacent poles in such a manner that charging all of said first coils with direct current and charging all of said second coils with alternating current synchronized with energizing all of said first coils alternately produces neutralizing of a given pole and serially magnetizing said given pole with a predetermined polarity opposite to that of its alternate poles.

2. The method of energizing poles of an electric motor as in claim 1, wherein the first coils are charged with direct current and wound about adjacent poles defining a first pole set and said second coils are charged with alternating current wound about adjacent poles defining a second pole set, each of said pole sets including one pole common to said sets.

3. The method of energizing the poles of an electric motor as in claim 2, said first coils of direct current being energized by the cycles of said second coils of alternating current.

4. A method of energizing poles of an electric motor wherein a stator and rotor have an even number of said poles, comprising the steps of:
   providing a stator having a substantially cylindrical structure having alternating salient protrusions and roots, wherein all of said salient protrusions have a common shape extending radially inward, and all of said roots have a common shape;
   providing a rotor having a substantially cylindrical structure coaxially aligned with said stator wherein salient protrusions of said rotor extend radially outward such that said salient protrusions of said stator and rotor are radially adjacent one another, wherein each of said salient protrusions of said stator at least partially oppose a corresponding salient protrusion of said rotor when at least one of said salient protrusions of said stator at least partially oppose a salient protrusion of said rotor;
   winding a first coil and a second coil about a pair of adjacent salient protrusions of said stator or rotor only to form said poles; and
   winding adjacent pairs of poles of the stator or rotor only with a common direct current (DC) coil, wherein said DC wound poles comprise a first set of poles, each first set consisting of first and second poles, winding adjacent pairs of poles with a common alternating current (AC) coil wherein said AC wound poles comprise a second set of poles, adjacent first and second sets of poles each including a common pole, connecting adjacent first sets of DC poles with each other in series, connecting adjacent second sets of AC poles in series with each other, connecting said first sets of DC poles in series with said second sets of AC poles, producing DC pulses in said DC poles in sync with the AC pulses in said AC poles in all of said poles and equalizing said DC and AC pulses wherein said common poles are alternately polarized and neutralized.

5. An electric motor having a rotatable rotor of an even number of poles alternately charged polarity and a stator having an even number of poles, the number of rotor and stator poles being a whole multiple of each other, comprising:
   said stator having a substantially cylindrical structure having alternating salient protrusions and roots, wherein all of said salient protrusions have a common shape extending radially inward, and all of said roots have a common shape;
   said rotor having a substantially cylindrical structure coaxially aligned with said stator wherein salient protrusions extend radially outward such that said salient protrusions of said stator and rotor are radially adjacent to one another, wherein each of said salient protrusions of said stator at least partially oppose a corresponding salient protrusion of said rotor when at least one of said salient protrusions of said stator at least partially opposes a salient protrusion of said rotor; and
   first coils wound about adjacent salient protrusions of said stator or rotor only forming first pole sets, second coils wound about adjacent salient protrusions of said stator or rotor coils only forming second pole sets, said pole sets each including one common pole, all of said first coils being energized by a direct current controlled by an alternating current energizing all of said second coils whereby said poles are alternately neutralized and charged with a predetermined polarity opposite to the polarity of the alternate poles and wherein said first coils and said second coils are in series with one another to provide a common current and balanced magnetic fluxes, non-energized poles of said rotor or stator thereby being attracted to said energized poles to rotate said rotor.

6. The electric motor as stated in claim 5, said direct current first coils of said first pole sets being energized by a rectifying bridge circuit connected to said alternating current second coils of said second pole sets.

7. The electric motor as stated in claim 5, further comprising:
   said poles spaced by slots wherein said poles and slots are uniformly shaped and spaced.

8. The electric motor as stated in claim 5, further comprising:
   said first coils and said second coils wound in substantially the same manner.

* * * * *

UNITED STATES PATENT AND TRADEMARK OFFICE
CERTIFICATE OF CORRECTION

| | | |
|---|---|---|
| PATENT NO. | : 7,276,831 B1 | Page 1 of 1 |
| APPLICATION NO. | : 10/315845 | |
| DATED | : October 2, 2007 | |
| INVENTOR(S) | : Durham et al. | |

It is certified that error appears in the above-identified patent and that said Letters Patent is hereby corrected as shown below:

In Col. 2, lines 34-35, please delete "motor However," and insert --motor. However,--;

In Col. 2, line 60, please delete "a set A" and insert --a set. A--;

In Col. 3, line 18, please delete "neutralized This" and insert --neutralized. This--;

In Col. 3, line 20, please delete "between This" and insert --between. This--; and In Col. 6, line 58, please delete "current When" and insert --current. When--.

Signed and Sealed this

Twenty-fifth Day of December, 2007

JON W. DUDAS
*Director of the United States Patent and Trademark Office*